Jan. 25, 1966 R. C. KIDD 3,231,099
AUTOMATIC STRUCTURAL BAR PUNCHING MACHINE
Original Filed Sept. 25, 1958 4 Sheets-Sheet 1
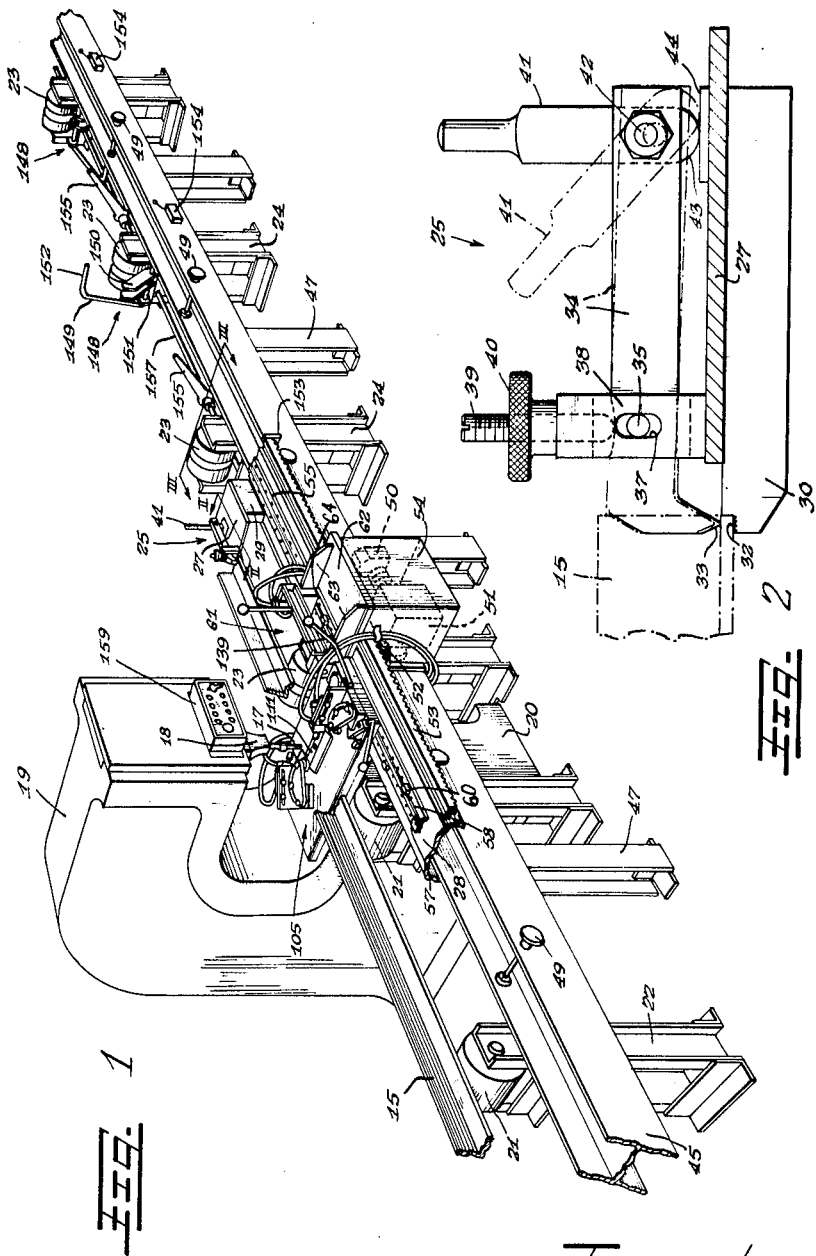
Inventor
Robert C. Kidd United States Patent Office 3,231,099
Patented Jan. 25, 1966

3,231,099
AUTOMATIC STRUCTURAL BAR PUNCHING MACHINE
Robert C. Kidd, Elmhurst, Ill., assignor to Mississippi Valley Structural Steel Company, Decatur, Ill., a corporation of Illinois
Original application Sept. 25, 1958, Ser. No. 763,255, now Patent No. 3,134,284, dated May 26, 1964. Divided and this application Feb. 26, 1964, Ser. No. 400,293
12 Claims. (Cl. 214—1.7)

This application is a division of my application Serial No. 763,255, filed September 25, 1958, now Patent No. 3,134,284, dated May 26, 1964.

The present invention relates to improvements in machines for punching holes in steel bars used for various structural purposes and is more particularly concerned with such a machine which is automatically operable to punch holes in predetermined spaced locations in long structural shapes such as angular, channel shaped and flat bars.

In fabrication of structural steel bars for such uses as building framework, road construction, bridges, and the like, punching of bolt holes and other holes, involved in connecting the bars in a structural framework design with and to other components of the construction, creates problems in handling the oftentimes long and heavy bars.

An important object of the invention is to provide an improved bar handling and ejecting means for automatic spaced hole punching machines.

Other objects, features and advantages of the present invention will be readily apparent from the following detailed description of a preferred form thereof taken in conjunction with the acompanying drawings, in which:

FIGURE 1 is a fragmentary perspective view of an automatically operable structural bar punching machine embodying features of the invention and with certain parts broken away and in section to illustrate details of structure;

FIGURE 2 is an enlarged fragmentary sectional elevational view of the work gripper of the machine taken substantially on the line II—II of FIGURE 1;

Figure 3:
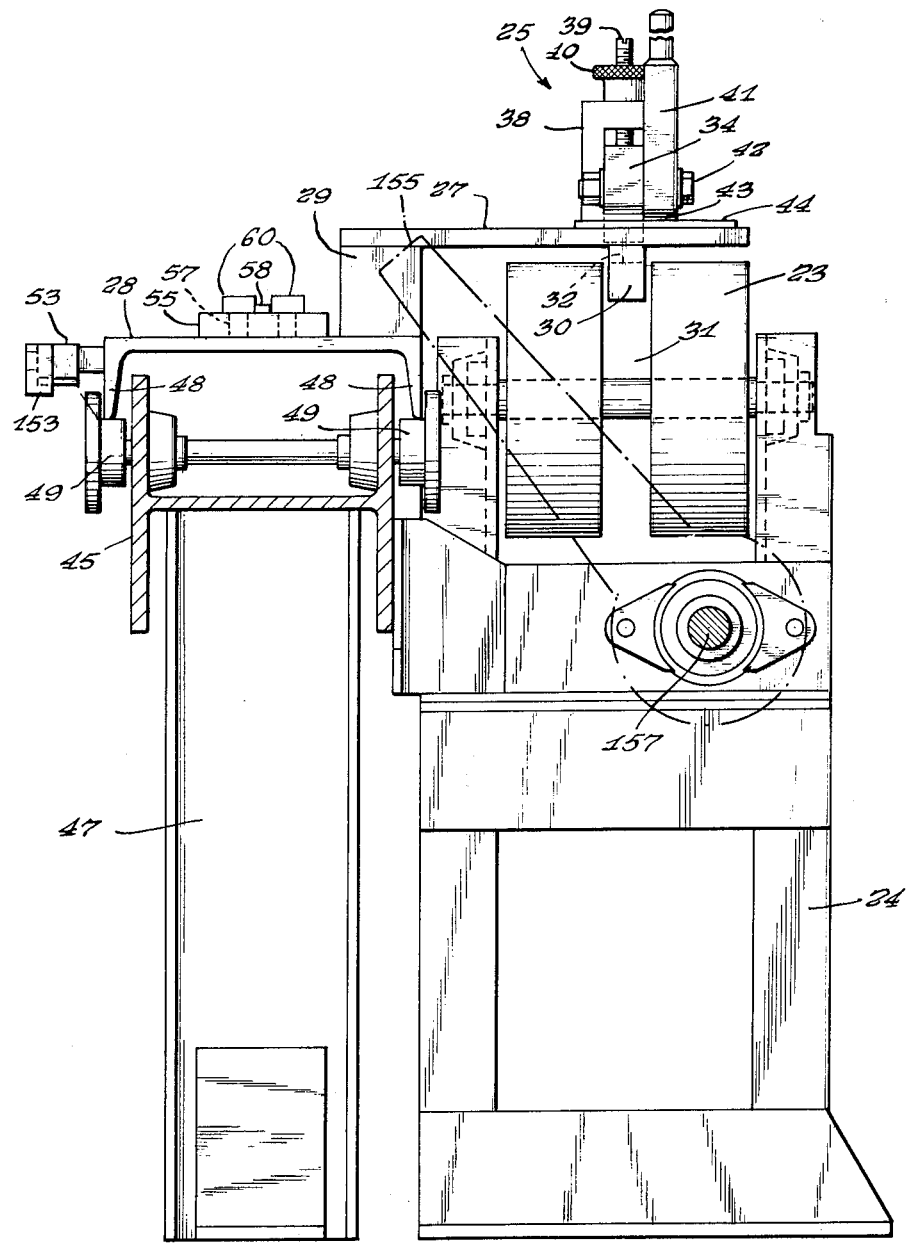
FIGURE 3 is an enlarged fragmentary vertical sectional elevational detail view taken substantially on the line III—III of FIGURE 1.

Referring to FIGURE 1, a machine embodying features of the invention is preferably constructed and arranged for handling structural bars such as steel bars 15, of which an angular section bar is shown by way of example, for punching through the bars at predetermined intervals holes of suitable size for receiving attaching or connecting means such as bolts, screws and rivets by which the respective bars are connected to other structural components and into a structural in which the bars are utilized. While the machine is well adapted for punching holes in either or both of the flanges of an angle bar of the kind depicted, it is equally well adapted for punching holes in flat bars, or in the webs of channel bars or other shaped bars or beams in which a flange or longitudinal part of the bar is exposed accessibly to a punch 17 vertically reciprocably supported by a ram 18 carried by the head portion of a suitable C-frame type structural punch unit 19 having under the punch head an anvil portion 20.

According to the present invention, the machine is adapted to handle and punch holes where desired in the flanges of the bar 15 substantially throughout its length. In practice bar lengths up to forty feet have been handled for punching but there is no limit upon practical bar lengths for which the machine capacity may be predetermined. To this end, the machine is equipped with a suitably spaced series of supporting idler rollers 21 mounted rotatably on roller standards 22 on one side of the punch unit 19, and a spaced series of idler rollers 23 carried by standards 24 on the opposite side of the punch unit. Each of the series of rollers 21 and 23 includes a sufficient number of rollers spaced at predetermined intervals such as five feet or less for a distance of as many feet from the respective sides of the center line of the punch unit 19 as desirable to handle bars to be punched of as great length as desired. This enables each of the successive bars 15 to be punched to be supported throughout its length and rolled into successive positions under the punch 17 and over the anvil 20 from end-to-end of the bar.

Means are provided for automatically advancing the bar 15 to be punched longitudinally from end-to-end under the punch 17, with suitable dwells at predetermined points along the length of the bar for punching of holes therein by the punch 17. For this purpose, a work gripper 25 is provided for engaging one end portion of the bar 15 mounted on a suitable carriage 27 supported by a travelling template carrier 28. In the present instance, the gripper 25 is shown as disposed at the right side of the punch unit 19 so as to be in a position to pull the bar 15 to be punched along the supporting rollers 21, under the punch 17 and onto the supporting rollers 23. In a convenient arrangement, the template carrier 28 is located in front of the punch unit 19 and the rollers 21 and 23, and the carriage 27 is in the form of a cantilever plate rigidly attached to the template carrier 28 through a spacer bar 29 and extending therefrom rearwardly into overlying relation to the rollers 23 and with the gripper 25 fixedly carried in longitudinal orientation centrally over the rollers 23 and aligned with a vertical axial plane through the punch 17 and extending through the centers of the rollers 21 and 23 (FIGS. 1 and 3).

In a practical construction, the gripper 25 comprises a fixed anvil bar 30 secured as by welding fixedly to the underside of the carriage plate 27 (FIGS. 2 and 3) disposed to project below the upper peripheries of the bar supporting rollers 23 which are for this purpose provided with respective suitable central grooves or gaps 31 to clear the gripper anvil bar 30. At its end portion nearest the punch unit 19, the gripper anvil bar 30 has a serration toothed or otherwise roughened upwardly facing fixed gripping jaw surface 32 disposed in substantially a plane with the tops of the peripheries of the supporting rollers 23. Coactive with the fixed jaw 32 is a bill-like releasable depending head jaw 33 on a pivotally mounted adjustable jaw bar 34. Releasing and clamping pivotal movement of the jaw bar 34 is on trunnions 35 located in adjacent but spaced relation to the jaw head 33 and projecting from the sides of the bar through vertically elongated respective bearing apertures 37 is an upright bearing frame 38 carried by the plate 27. The vertical dimension of the bearing apertures 27 is such as to afford a range of vertical jaw adjustment through a thrust pin 39 threaded through the top of the frame 38 and having a lower thrust end engageable slidably thrustingly against the opposed top of the jaw bar 34 and held in its adjusted position by a lock nut wheel 40.

Actuation of the jaw bar 34 to open and close the jaw 33 is effected through a cam latch lever 41 pivotally connected by means such as a pin or bolt 42 to the opposite end portion of the jaw bar 34 from the jaw 33 and having on its lower end a cam surface 43 engageable with a hardened thrust plate 44 mounted on the top of the carriage plate 27. When the latch lever 41 is in the full line position, action of its cam end 43 against the plate 44 pivots the jaw 34 about the trunnion pivot 35 to swing the jaw arm 33 down toward the fixed jaw 32 to grip the end portion of the bar interposed therebetween firmly, proper adjustment having been made by manipulation of the thrust member 39 and the lock nut member 40 for the thickness of the bar to be gripped. For releasing the bar 15 from the gripper, the latch lever 41 is swung down, as indicated in dash outline so that the attached end of the jaw bar 34 may swing down and thus raise the movable jaw 33 or at least release its grip from the engaged end portion of the bar 15. Re-engagement of the gripper with another one of the bars 15 is easily effected by inserting the end portion of the bar into the gripper jaws and then moving the latch lever 41 into the erect full line position wherein effective gripping of the bar to be punched between the jaws 32 and 33 results from the fairly long leverage between the fulcrum afforded by the trunnions 35 and the thrust tip of the member 39 and the jaw bar end raising, cam portion 43 of the latch lever.

In an efficient form, the template and gripper carrying member 28 is in the form of an inverted channel of suitable width and of a length at least as long as the maximum length of bar to be punched, the gripper carriage 27 being mounted on the head or leading end portion of the carrier 28. As best seen in FIGURES 1 and 3, a suitable supporting and guiding structure for the carrier 28 comprises a continuous longitudinal frame 45, herein in the form of a continuous H-beam extending the full length of the machine forwardly alongside the series of rollers 21 and 23 and in front of the punch unit anvil 20 and carried by a suitably spaced series of supporting columns 47. The upstanding flanges of the frame member 45 are spaced apart less than depending longitudinal side flanges 48 of the carrier 28 and support flanged pairs of idler rollers 49 upon which the lower, free edges of the carrier flanges 48 ride for longitudinal reciprocable movement of the carrier 28 over the supporting frame 45.

Means for reciprocably advancing and returning the carrier 28 comprise powered actuating means including a hydraulic motor 50 and a reduction gear mechanism 51 driven thereby and drivingly connected to a gear 52 (FIG. 1) meshing with a rack 53 secured to the outer side and substantially throughout the length of the carrier 28. A housing 54 for the motor 50 and the reduction gear mechanism 51 is mounted upon the supporting frame 45 preferably adjacent to the starting position side of the punch unit 19.

On its upper face, the carrier 28 has secured longitudinally centrally thereof a template strip plate 55 extending throughout the length of the carrier and provided with two uniformly spaced relatively longitudinally alternately offset parallel series of upwardly opening template bores 57 (FIGS. 1 and 3) located on respectively opposite sides of a narrow longitudinally extending divider and scale strip 58 on the upper surface of which suitable graduations by inches or other desirable scale indicia may be provided. Selectively engageable in the holes 57 are respective stems of gauge or template pin blocks 60 by which holes to be punched in the bars 15 are gauged.

Coactive with the template blocks 60 is indexing mechanism 61 which is constructed and arranged to control an electro-hydraulic circuit, presently to be described, for properly successively positioning the bar 15 to be punched with respect to the punch 17. For this purpose, the motor housing 54 carries a top plate 62 of substantial rigidity lying along its inner margin over the near or outer margin of the template carrier 28 and supporting adjacent to its opposite side margins respective supporting arm bars 63 which project into overlying relation to the central portion of carrier 28 and more particularly the template strip 55. For maximum stability, extension portions of the table plate 62 may extend in underlying relation to the bars 63 with a cutout opening 64 exposing the carrier member 28 and the template strip 55.

Among controls carried by the indexing mechanism is a template control stop finger 92 (FIG. 4) carried by a vertically reciprocable plunger 93 mounted on the lower end of a piston rod 94 projecting from a fluid operator such as a hydraulic piston 95.

In addition to carrying the stop pin or finger 92, the plunger 93 also preferably supports a rocker arm lever 100 normally spring-urged to dispose a contact finger 101 rearwardly of the stop face of the stop finger 92 to be engaged and swung forwardly by the template member 60 that comes into stopping engagement with the stop finger 92, for thereby tripping a projecting trip pin 103 of a limit switch unit 104 in control of the operating circuit for a work-gripping and holding device 105 (FIG. 1) and also the control circuit for actuating the punch unit 19. As the bar 15 to be punched comes to a stop under the punch 17, means including plungers 117 (FIG. 4) of the gripping device 105 are actuated by fluid operators 130 for firmly gripping the bar and holding it against lateral misalignment or shifting relative to the punch and an underlying punch block 111. A handle 139 enables manual resetting of the gripping device 105.

After the last hole has been punched in the bar 15 and the trailing end of the bar has been cleared from the punch, the bar is released from the gripper 25 and removed from the machine. This is preferably effected automatically by means associated with the work conveying section of the machine embodying the supporting rollers 23. To this end, a combination gripper release and bar stop unit 148 (FIG. 1) is activated at a suitable distance from the punch unit 19. By preference a plurality of gripper release and stop units 148 is provided at suitably graduated longitudinally spaced intervals along the conveyor provided by the rollers 23 to accommodate various lengths of work piece. In each instance, the unit 148 comprises a generally inverted L-shaped release arm 149 and a stop bar structure 150, both mounted pivotally on a rock shaft 151 pivotally supported on one of the roller carrying standards 24 in suitable position to be moved from an out of the way, inactive position as shown at the far right end of FIGURE 1 into an active position as shown with the first of the units 148 in the series. In the active position, the arm 149 extends upwardly with a transverse angular head 152 disposed in the path of the gripper latch arm 41. As the carrier 28 moves the gripper 25 under the release arm head 152, the latch arm 41 is swung down by engagement with the release arm head and thus opens the gripper jaws to release the punched bar 15. The gripper 25 continues to move on and the stop bars 150 engage the end of the bar 15 and positively strip the same from the gripper, should there be any tendency to stick in the gripper jaws, and more importantly to restrain the bar against possible momentum induced onward travel.

Figure 4:
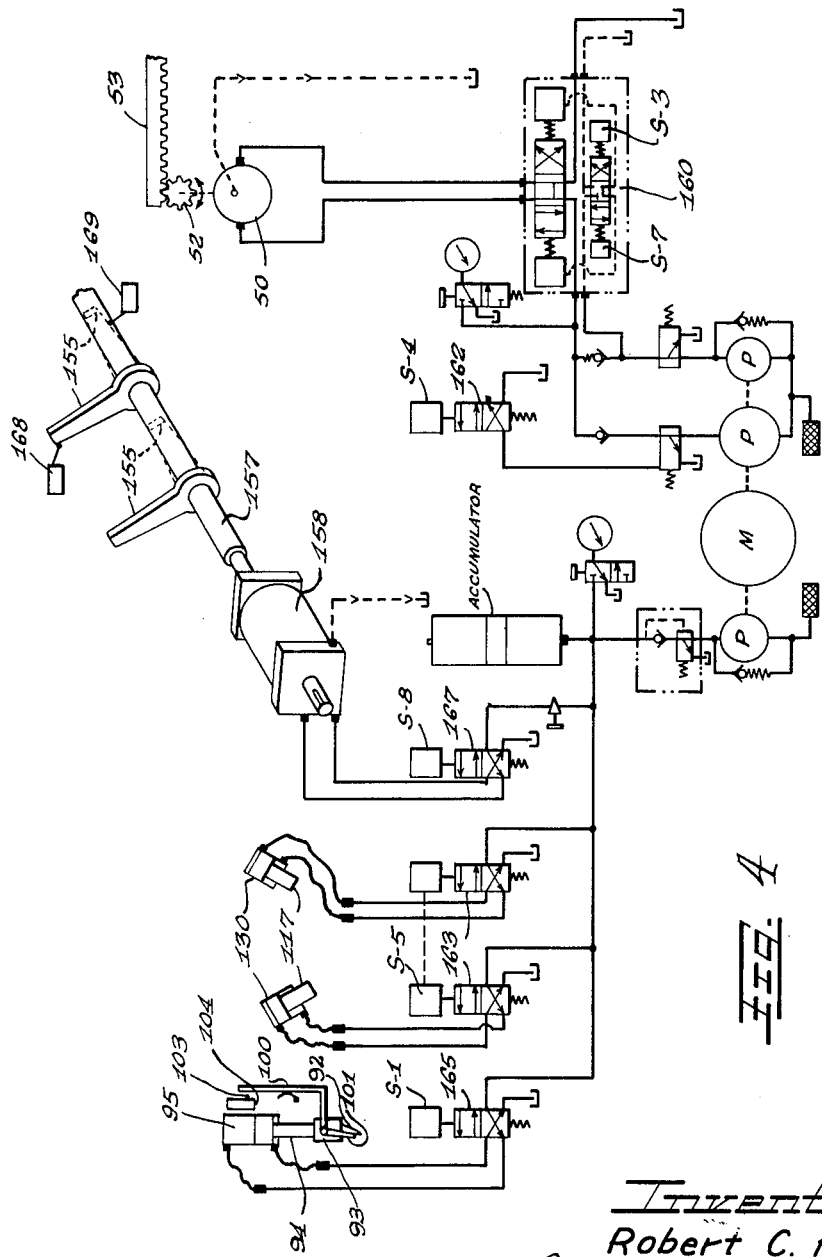
FIGURE 4 is a more or less schematic electrohydraulic operating diagram.

Close to the point where the gripper 25 is released from the bar 15 by the release and stop mechanism unit 48, a trip finger 153 carried by the advancing end of the rack 53 engages and trips the actuating arm of a limit switch 154 which not only controls the operating circuit of the machine to halt advance of the carrier 28 but also activates the circuit to operate a work ejector comprising a longitudinally spaced series of ejector arms 155 fixedly carried by a comomn shaft 157 (FIGS. 1 and 3) rotatably mounted on the roll supporting standards 24 and adapted to be rotated by suitable means such as a hydraulic motor 158 (FIG. 4). Normally the ejector arms are disposed to lie in clearance relation at the forward side of the advancing work piece. During ejecting or unloading action, the ejector arms 155 are swung toward the rear of the machine to thereby dump the punched work piece from the supporting rollers 23. At the end of their work unloading action, the ejector arms 155 are promptly returned to their starting or ready position, and the carrier 28 returns to its starting position for another working cycle.

Figure 5:
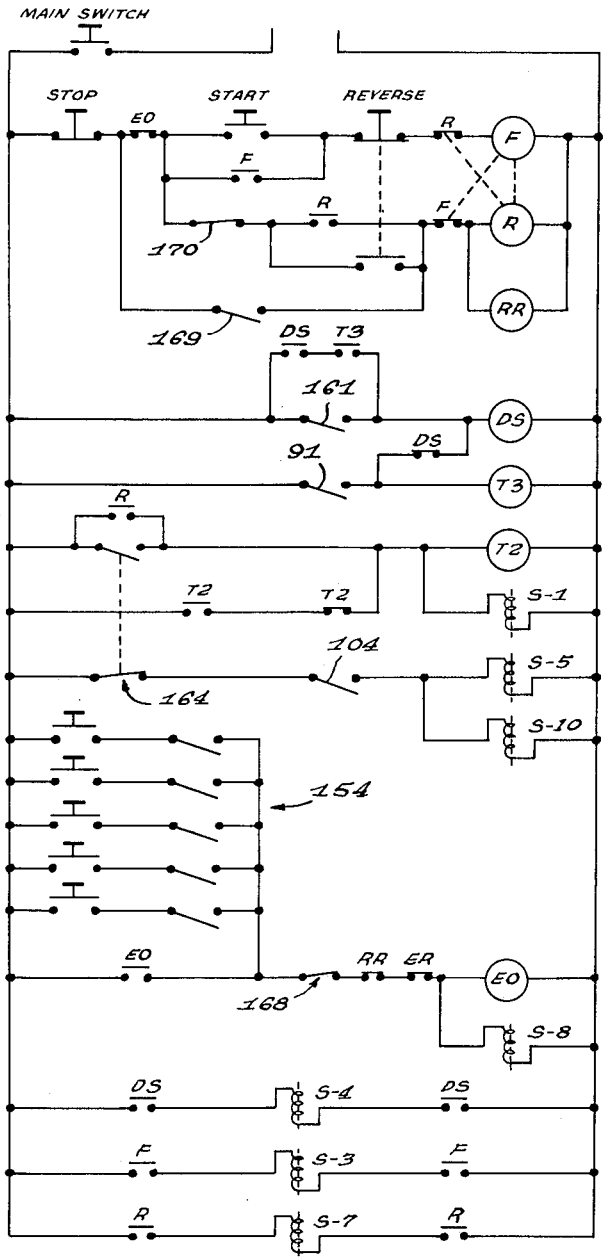
FIGURE 5 is a simplified electrical wiring diagram.

A combination of hydraulic and electrical circuits is utilized in cyclically, automatically operating the machine, and these circuits are shown schematically and diagrammatically in FIGURES 4 and 5. In the hydraulic circuit of FIGURE 4, standard symbols have been used. A simplified electrical diagram is shown in FIGURE 5. For ready correlated identification, the various contacts and switches controlled by the several relays and timers bear the same letter or letter and numeral combination references.

Assuming that the master switch has been closed and that the motor driving the several hydraulic pumps is operating and the carrier 28 is in starting position, the person operating the machine loads one of the work pieces 15 onto the rollers 21 (FIG. 1) and engages and locks the end of the work piece in the gripper 25, the forward or advance end portion of the work piece being guidably disposed between the clamping heads 114, with the operatively disposed clamping plunger 117 retracted by its fluid operator 130. The operator then pushes the "start" button to initiate an automatic cycle of operation of the machine as controlled by the electrical circuit of FIGURE 12. Should anything go wrong, the operator can instantly stop the machine by pressing the "stop" button. The various electrical circuit control buttons may be conveniently mounted on a control panel 159 carried by the front of the head of the punch unit 19 (FIG. 1) or on any other convenient place on the machine, such for example, as on the table 62 at the front of the machine.

Closing of the "start" switch closes the circuit for energizing relay F which generally controls forward movement of the carrier 28 by closing switches F to energize a solenoid S–3 which motivates hydraulic control valve mechanism 160 (FIG. 4) for opening a hydraulic circuit to drive the hydraulic motor 50 for moving the carriage 28 forwardly. Since generally holes must be punched in the leading end portion of the work piece, it is desirable to advance the carrier at initially slow or creep speed, and therefore means (not shown) associated with the carrier 28 initially holds closed a normally open limit switch 161 controlling energizing circuit for a relay DS which while energized closes switch contacts in a circuit controlling a solenoid S–4 which is thus energized to open a pressure relief valve 162 whereby forward movement of the carrier 28 is at creep speed. Should there be no punching of the work piece required within a short travel span after starting of forward movement of the carrier 28, the limit switch 161 opens, deenergizing relay DS and thus the solenoid S–4 and as a result full hydraulic pressure to the motor 50 causing driving of the carrier 28 at rapid forward speed.

Upon closing of the limit switch 91 controlled by the template 60, the circuit for energizing the relay DS is closed thus effecting energization of solenoid S–4 and forward movement of the carrier 28 at creep speed. This also effects energization of a timer T3 which acts to hold the energizing circuit for the relay DS closed after normally open limit switch 91 opens by advance of the tripping template member 60 toward the stop pin or finger 92 interposed in its path.

As the advancing template member 60 comes into engagement with the stop finger 92 it trips the switch actuating arm 100 and closes the normally open limit switch 104 thereby energizing a solenoid or solenoids S–5 for operating respective hydraulic control valves 163 for supplying hydraulic fluid to the hydraulic operators 130 and projecting the selected active clamping plunger 117 into clamping engagement with the work piece. At the same time there is energized a circuit for a solenoid S–10 in control of means by which the customary clutch associated with the punch unit 19 is activated to effect a punching stroke of the punch ram 18 and thus punching of the work piece 15 at the predetermined point by coaction of the punch 17 with the die 111.

On return of the punch 17 and its ram 18 from the punching stroke, a double acting relay switch 164 is suitably actuated thereby to deenergize the solenoids S–5 and S–10, thus effecting retraction of the work clamping plunger 117 and halting of the punch, and at the same time closing a circuit to energize a timer T2 and a solenoid S–1 by which a hydraulic control valve 165 is actuated to effect hydraulic return of the stop plunger 93 through action of the fluid operator 95. The timer T2 effects a time delay in deenergization of the solenoid S–1 long enough to clear the template member 60 from which the stop finger 92 has been released.

If a succeeding template member 60 now effects actuation of the limit switch 91, the carrier 28 moves forwardly at creep speed until another punching cycle is initiated by the limit switch 104. In the absence of an immediately acting template member 60, the carrier 28 moves forwardly at rapid speed until the next succeeding template member 60 acts to actuate limit switch 91.

After the work piece has passed beyond the punch press, and the gripper 25 has been released from the work piece and the work piece stopped by the release and stop mechanism 148, the carrier 28 moves on to the preselected limit switch 154. It may be observed that preselection is effected herein by means of a suitable manual switch, for each of the limit switches 154, located at the electrical control station afforded by the control panel 159.

Upon closing of the preselected limit switch 154 by the trip 153 of the carrier, a relay EO is energized, which effects deenergization of the relay F as well as the solenoid S–3 so that the hydraulic motor 50 is stopped and the carrier 28 halted. At the same time, the relay EO energizes a solenoid S–8 operating a hydraulic control valve 167 for directing hydraulic fluid to operate the hydraulic motor 158 to actuate the rock shaft 157 and thereby the ejector arms 155 to eject the punched work piece. At the end of the ejecting action of the arms 155, a limit switch 168 is opened to deenergize the relay EO and thus the solenoid S–8, whereby the hydraulic control valve 167 shifts to the ejector return position and the ejector arms 155 are swung back to the ready position wherein a normally open limit switch 169 is closed to energize relays R and RR and a solenoid S–7 is energized to actuate the control valve mechanism 160 for hydraulically reversing the hydraulic motor 50 for returning the carrier 28 at rapid speed toward starting position. Near the end of the return traverse of the carrier 28, the limit switch 161 is closed to energize the relay DS and thereby the solenoid S–4 for thereby slowing the carrier down to creep speed until the carrier effects opening of a limit switch 170 to deenergize the relays R and RR and thereby the solenoid S–7 to bring the carrier to a halt at starting position.

If it is desired to return the carrier 28 before the work piece has been released therefrom, as where double flange or double row punching of the work piece is to be effected, the operator actuates a "reverse" switch before the gripper 25 reaches the preselected release arm 149, 152. This causes the relay F to be deenergized and the relay R to be energized for rapid return of the carrier and the work piece still clamped in place relative thereto. When the carrier 28 has returned to its starting position and comes to a stop, the work piece is reclamped to position the second longitudinal portion thereof to be punched, and the operator swings the index support bar 69 by means of the handle 72 into the second or alternate position from the position in which it was during the first punching run of the carrier. On pushing the "start" button, the carrier is advanced through another working cycle.

Although herein the machine is shown as including a punch press, which is especially well suited for making holes in light and medium weight materials, heavier materials may require a drill press for making the holes. It will be readily apparent that a drill press could be substituted for the punch press without significant change in structure of the other components of the machine. Therefore, "punching" should be considered herein as including drilling or other desirable hole or aperture forming expedient.

It will be understood that modifications and variations may be effected without departing from the scope of the novel concepts of the present invention.

I claim as my invention:

1. In combination in apparatus including means for transportably carrying a structural bar longitudinally through punching mechanism and means for advancing the bar indexably along said transporting means, a combination bar release and stop mechanism including a shaft for rockable support by the bar transporting means and carrying a release arm and stop structure movable into operative position or into an out of the way position by rocking of said shaft, said arm being operative to release the punched bar from the advancing means and the top structure being operative to engage the advancing end of the punched bar to halt its advancing movement after the bar has been released from the advancing means.

2. Apparatus for processing elongated work pieces comprising,
   means for supporting the work pieces transportably including a longitudinally disposed series of work supporting rollers and means rotatably carrying the rollers,
   means for unloading the work pieces from the terminal end portion of the series of rollers including a shaft carried by said roller supporting means, and a plurality of ejector arms carried by the shaft and swingable by rocking of the shaft from a ready position on one side of the path of movement of the work pieces on the rollers into an ejecting arc of movement across the path of movement of the work pieces to unload the work pieces laterally from the series of rollers,
   electrical control means including a switch having an actuator operated when the work pieces to be ejected reach said terminal end portions for controlling operations of said shaft to rock and swing said arms in said ejecting arc of movement,
   and electrical switch means operated by one of said arms on reaching the end of said ejecting arc of movement to effect return of said shaft and arms to said ready position.

3. Apparatus for processing elongated work pieces comprising,
   means for supporting the work pieces transportably including a longitudinally disposed series of work supporting rollers and means rotatably carrying the rollers,
   means for unloading the work pieces from the terminal end portion of the series of rollers including oscillatable supporting means,
       and a plurality of ejector arms carried by said oscillatable supporting means and swingable by rocking oscillation of said oscillatable supporting means from a ready position on one side of the path of movement of the work pieces on the rollers in ejecting arc of movement across the path of movement of the work pieces and to an unloading position on the opposite side of said path to unload the work pieces laterally from the series of rollers and then returning to said ready position,
       and means for automatically actuating said oscillatable supporting means comprising electrical switch means operated by one of said plurality of ejector arms.

4. In combination in apparatus including means for transportably carrying a structural bar longitudinally through punching mechanism and means for advancing the bar indexably along said transporting means,
   a combination bar release and stop mechanism including a shaft for rockable support by the bar transporting means and carrying a release arm and stop structure movable into operative position or into an out of the way position by rocking of said shaft,
   said arm being operative to release the punched bar from the advancing means and the stop structure being operative to engage the advancing end of the punched bar to halt its advancing movement after the bar has been released from the advancing means,
   and means for unloading the halted bar from the transporting means including:
       a plurality of ejector means mounted at spaced intervals along the path of movement of the bars to said stop structure,
       and means for swinging the ejector arms from a ready position on one side of said path in an ejecting throw across said path to move the halted bar laterally from said path.

5. Apparatus as defined in claim 4, including a rockable shaft mounting said ejector arms and having a hydraulic actuator for oscillating it between the ready and ejecting positions of the ejector arms, and electrical control means including limit switches contacted by said ejector arms.

6. Apparatus for transportably carrying elongated work pieces through a processing path including,
   means for transportably carrying a work piece along said path including a carriage having a work piece gripping mechanism,
   means for advancing the carriage to a limit position,
   means operative at said limit position to release said gripping mechanism from the work piece,
   ejector mechanism for unloading the work piece from said carrying means,
   and means controlled by said ejector means for returning said carriage to a starting position.

7. Apparatus as defined in claim 6, including means controlled by said carriage for operating said ejector mechanism.

8. Apparatus for transportably carrying elongated work pieces through a processing path including,
   means for transportably carrying a work piece along said path including a carriage having a work piece gripping mechanism,
   means for advancing the carriage to a limit position,
   means operative at said limit position to release said gripping mechanism from the work piece,
   ejector mechanism for unloading the work piece from said carrying means,
   and means controlled by said carriage for actuating said ejector mechanism.

9. In combination in apparatus for transportably carrying an elongated work piece longitudinally along a processing path,
   said means comprising a work piece gripper jaw and an actuating lever,
   a combination work piece release and stop mechanism including a release arm and a stop mounted along said path and movable into operative position or into an out of the way position relative to said path,
   said arm being operative in the operative position to actuate said lever for releasing the work piece and said stop being then operative to halt the advancing movement of the work piece.

10. In combination in apparatus for transportably carrying an elongated work piece longitudinally along a processing path,
    said means comprising a work piece gripper jaw and and an actuating lever,
    a combination work piece release and stop mechanism including a release arm and a stop mounted along said path and movable into operative position or into an out of the way position relative to said path,
    said arm being operative in the operative position to actuate said lever for releasing the work piece and said stop being operative to halt the advancing movement of the work piece, and means coordinated in operation with said arm and said stop to eject the work piece laterally from said path after said stop has halted the work piece.

11. Apparatus for transportably carrying elongated work pieces through a processing path including, means for transportably carrying a work piece along said path including a carriage having a work piece gripping mechanism, means for advancing the carriage to a limit position, means operative at said limit position to release said gripping mechanism from the work piece, ejector mechanism for unloading the work piece from said carrying means, means controlled by said carriage for actuating said ejector mechanism, and electro-hydraulic means for operating said ejector means and said carriage and including electrical control switches actuated by said ejector means.

12. Apparatus for transportably carrying elongated work pieces through a processing path including, means for transportably carrying a work piece along said path including a carriage having a work piece gripping mechanism, means for advancing the carriage to a limit position, means operative at said limit position to release said gripping mechanism from the work piece, ejector mechanism for unloading the work piece from said carrying means, means controlled by said carriage for actuating said ejector mechanism, said ejector means comprising ejector arms and said control switches comprising limit switches actuated by one of said arms at respective opposite extremes of a cycle of movement of the arms.

References Cited by the Examiner

UNITED STATES PATENTS

| | | | |
|---|---|---|---|
| 945,687 | 1/1910 | Boyle | 214—1.1 |
| 1,080,793 | 12/1913 | Vold | 271—54 |
| 1,392,871 | 10/1921 | Heffelfinger | 83—277 X |
| 1,570,928 | 1/1926 | Thomas | 214—1.3 X |
| 1,941,117 | 12/1933 | Teach | 214—1.7 X |
| 2,597,941 | 5/1952 | Long. | |

MARVIN A. CHAMPION, *Primary Examiner.*